US008757393B2

(12) United States Patent
Thienel

(10) Patent No.: US 8,757,393 B2
(45) Date of Patent: Jun. 24, 2014

(54) REPLACEABLE FILTER HAVING A FILTER CLOSURE SYSTEM

(75) Inventor: Michael Thienel, Thurnau (DE)

(73) Assignee: Mann + Hummel GmbH, Ludwigsburg (DE)

( * ) Notice: Subject to any disclaimer, the term of this patent is extended or adjusted under 35 U.S.C. 154(b) by 0 days.

(21) Appl. No.: 13/334,662

(22) Filed: Dec. 22, 2011

(65) Prior Publication Data

US 2012/0152199 A1    Jun. 21, 2012

Related U.S. Application Data

(63) Continuation of application No. PCT/EP2010/058962, filed on Jun. 24, 2010.

(30) Foreign Application Priority Data

Jun. 24, 2009 (DE) .......................... 10 2009 030 499

(51) Int. Cl.
*B01D 35/30* (2006.01)
*B01D 27/08* (2006.01)
*B01D 27/10* (2006.01)
*B01D 27/04* (2006.01)

(52) U.S. Cl.
USPC ........... 210/455; 210/232; 210/238; 210/435; 210/437; 210/440; 210/443; 210/450; 210/451; 210/457

(58) Field of Classification Search
USPC ........... 210/435, 440, 443, 450, 455, DIG. 17
See application file for complete search history.

(56) References Cited

U.S. PATENT DOCUMENTS

| 5,891,334 | A * | 4/1999 | Gundrum et al. | ............. | 210/232 |
| 6,830,683 | B2 * | 12/2004 | Gundrum et al. | ............. | 210/232 |
| 6,926,827 | B2 | 8/2005 | Gruca et al. | | |
| 2005/0178713 | A1 * | 8/2005 | Stockbower | .................. | 210/437 |
| 2006/0231481 | A1 * | 10/2006 | Komine et al. | ............... | 210/443 |
| 2008/0060992 | A1 | 3/2008 | Komine et al. | | |
| 2009/0078626 | A1 | 3/2009 | Krull et al. | | |
| 2009/0242476 | A1 * | 10/2009 | Muenkel et al. | ......... | 210/497.01 |

FOREIGN PATENT DOCUMENTS

EP          2100655 A1    9/2009
WO     2006016924 A1    2/2006

* cited by examiner

*Primary Examiner* — Benjamin Kurtz
(74) *Attorney, Agent, or Firm* — James Hasselbeck

(57) ABSTRACT

A replaceable filter has a filter housing with a cylindrical connecting end. A housing lid has a cylindrical counter connecting member matching the cylindrical connecting end. A filter closure system seal-tightly connects by form fit the cylindrical connecting end and the cylindrical counter connecting member when the connecting end is inserted or pushed onto the counter connecting member in an axial connecting direction and moved relative to the counter connecting member. An annular member is arranged coaxially relative to the connecting end and has a terminal edge area that is connected seal-tightly to the filter housing such that the annular member and the connecting end define a receptacle for the cylindrical counter connecting member. A sealing device is arranged in the receptacle and connected to the filter housing. The sealing device interacts with the counter connecting member.

13 Claims, 5 Drawing Sheets

REPLACEABLE FILTER HAVING A FILTER CLOSURE SYSTEM

CROSS-REFERENCE TO RELATED APPLICATIONS

This application is a bypass continuation application of international application No. PCT/EP2010/058962 having an international filing date of 24 Jun. 2010 and designating the United States, the International Application claiming a priority date of 24 Jun. 2009, based on prior filed German patent application No. 10 2009 030 499.1, the entire contents of the aforesaid international application and the aforesaid German patent application being incorporated herein by reference.

BACKGROUND OF THE INVENTION

The invention concerns a replaceable filter in particular for motor vehicles or industrial motors, in particular oil filters, fuel filters or coolant filters. The replaceable filter comprises a filter closure system for seal-tight connection of a cylindrical connecting end at the end face of a filter housing with a cylindrical counter connecting member of a housing lid that corresponds to or matches the connecting end. The connecting end can be inserted or pushed onto the counter connecting member in axial connecting direction and, by means of a plug-in and/or rotational movement, can be positively (form-fittingly) connected to the housing lid. An annular member is arranged coaxially relative to the cylindrical connecting end of the filter housing and is connected seal-tightly with a terminal edge area with the filter housing in such a way that the annular member and the cylindrical connecting end form a receptacle for the cylindrical counter connecting member of the housing lid.

Moreover, the invention concerns an internal combustion engine with a connecting head for a replaceable filter.

Finally, the invention concerns a method for mounting a replaceable filter, in particular for motor vehicles or industrial motors, in particular oil filters, fuel filters or coolant filters. According to the method, a cylindrical connecting end at the end face of a filter housing is seal-tightly connected with a cylindrical counter connecting member of a housing lid that corresponds to or matches the connecting end, wherein the connecting end is inserted into or pushed onto the counter connecting member in axial connecting direction and, by means of a plug-in and/or rotational movement, is positively (form-fittingly) connected to the housing lid. An annular member is arranged coaxially relative to the cylindrical connecting end of the filter housing and is connected seal-tightly with a terminal edge area with the filter housing in such a way that the annular member and the cylindrical connecting end form a receptacle for the cylindrical counter connecting member of the housing lid.

DE 102 01 455 A1 discloses a liquid filter container for internal combustion engines that comprises a filter receptacle and a lid. When the lid is mounted on the filter receptacle, the lid delimits together with the filter receptacle an interior cavity that is designed to receive a filter element. The filter receptacle is provided with an annular wall. The removable lid comprises, on the one hand, a head part from which an annular wall projects. The annular wall of the lid can be inserted into the annular wall of the filter receptacle. The lid is locked on the filter receptacle by a bayonet closure. The bayonet closure is realized, as is known to a person skilled in the art, by means of a combined insertion/rotation movement. The filter container comprises moreover a seal that is suitable to be arranged and compressed between the annular wall of the lid and the annular wall of the filter receptacle. For ensuring seal-tightness, it is required that the annular wall of the filter receptacle has a contact surface for the seal that has a section that is substantially of a truncated cone shape and oriented in radial inward direction while the annular wall of the lid has a contact surface that is suitable to force the seal axially and radially against the truncated cone shape section of the contact surface of the filter receptacle. The seal-tightness of the connection is thus dependent on the axial securing force between the filter receptacle and the lid that is generated by the bayonet closure. This securing force, however, can be affected by different expansions of the annular walls in the area of a bayonet closure, in particular as a result of temperature changes. Moreover, the exterior side of the seal that is facing away from the interior is unprotected with respect to environmental effects and pollution. Thus, it can happen that dirt and/or moisture will collect on the exterior side of the seal and reach the interior as soon as the filter receptacle is separated from the lid. This must be avoided at all costs in order to prevent operational failure of the internal combustion engine.

U.S. 2009/0078626 A1 discloses a filter cartridge with a filter housing in which a filter medium is arranged. The filter housing has at its open end a receiving groove with a threaded section into which a counter connecting member of a filter head can be screwed with an appropriately matched threaded section.

SUMMARY OF THE INVENTION

It is therefore an object of the present invention to design a replaceable filter with a filter closure system of an internal combustion engine and a method of the aforementioned kind with which filtering is improved and seal-tightness of the connection of the filter housing and the housing lid is optimized.

In accordance with the present invention, this is achieved in that in the receptacle a sealing device is arranged that is connected to the filter housing and that interacts with the counter connecting member of the housing lid.

According to the invention, a receptacle is provided at the housing into which the cylindrical counter connecting member of the housing lid is inserted. The cylindrical connecting end, the annular member, and the intermediately positioned cylindrical counter connecting member constitute a type of labyrinth seal that, when separating the housing lid from the filter housing, prevents that dirt and/or moisture that has collected in the connecting area can reach the interior of the housing. In this receptacle, a sealing device, in particular one that comprises an O-ring seal, is simply arranged so as to be protected from environmental effects, dirt, and moisture. Since the sealing device is connected with the filter housing, it can be pre-mounted in a simple way in the replaceable filter and exchanged together therewith.

Moreover, elements of the filter closure system associated with the housing can be arranged in the receptacle so that, even when the housing lid is removed, in particular in case of servicing and repair work, they are protected and cannot be destroyed or soiled, particularly when placing the filter housing onto a hard and/or soiled surface. The housing-associated elements of the filter closure system can be advantageously attached separate from the annular member immediately on the filter housing so that they are not stressed particularly by pulsating pressure changes that may occur within the filter housing. The receptacle that is in particular of a U-shape fulfills moreover a guiding function for guiding the counter connecting member when connecting housing lid and filter housing so that assembly is simplified. Moreover, the annular member stabilizes the entire arrangement so that the housing lid and/or the filter housing can be produced with a less massive structure; this is beneficial with respect to weight.

In an advantageous embodiment, the sealing device can have a radially acting seal. The radially acting seal has the advantage that provides a sealing action independent of the insertion depth or screw-in depth of the counter connecting member into the receptacle and independent of the closure force.

In a further advantageous embodiment, the annular member can be of a hollow-cylindrical configuration. A hollow-cylindrical annular member has an expansive contact surface for the counter connecting member of the housing lid. This improves securing of the counter connecting member in the receptacle and counteracts deformations in the area of the filter closure system as a result of temperature changes and/or pressure changes. The contact surface improves moreover the guiding action for the counter connecting member upon insertion.

In a further advantageous embodiment, the connecting end of the filter housing and the counter connecting member of the housing lid can have matching elements of a releasable quick connection, in particular of an insertion-rotation connection, preferably a bayonet closure, or of a screw connection or a snap-on connection. The advantage here is that the filter housing and the housing lid, particularly in case of maintenance or repair work, can be separated easily. Insertion-rotation connections, such as in particular bayonet closures, have moreover the advantage that they have a great carrying and securing force that can be achieved even with minimal mounting forces and that they enable a fast assembly and disassembly. Insertion-rotation connections moreover enable the use of the filter closure system within very tight spaces.

The annular member advantageously can be arranged within the connecting end of the filter housing. A connecting area of the annular member with the filter housing can thus be arranged in a protected position within the housing. This has also a positive effect on the external contour of the filter housing because the connection requires no seams or transitions at the exterior side of the filter housing. The inwardly positioned annular member moreover can take over further securing, guiding and/or sealing functions, in particular in interaction with a preferably exchangeable filter element. Moreover, this embodiment is particular suitable for housing lids in which the elements of the filter closure system are arranged on the exterior side of the counter connecting member. In particular in case of housing lids made of metal, externally positioned elements can be realized in a simple way.

Advantageously, the annular member can have a securing device for the filter insert, in particular, a snap connection for an end element of the filter insert. A separate securing device is thus not needed.

Moreover, advantageously the sealing device, in particular a sealing groove with an annular seal, can be arranged on the annular member. In this way, the securing function of the filter closure system is separate from the sealing function. An effect on the sealing function of possibly occurring forces, in particular pulsating pressure changes in the filter housing, is reduced in this way.

Moreover, advantageously, the annular member can have a receiving space for at least one shut-off device, in particular comprising a non-return diaphragm. In the receiving space, the at least one shut-off device can be simply arranged without separate fastening elements being required.

Expediently, the shut-off device can be seal-tightly connected in particular by means of pressfit or welding, preferably laser welding, to the annular member. A separate sealing action of the connecting area of the shut-off device with the annular member is thus not required. Pressfit or welding are moreover easy to realize.

In a further advantageously embodiment, the terminal edge area of the annular member can be connected to the filter housing by means of welding, in particular laser welding, or by an adhesive. In case of welding, a seal-tight and stable connection can be realized in a simple way. An adhesive connection can be realized with simple technical means. The connection can also be produced with other simple methods.

Advantageously, the annular member, at least in the area of its terminal edge area with which it is connected with the filter housing, can be made of a material that is transparent for laser radiation. The connecting area of the filter housing that is to be welded or fused to the annular member can thus be irradiated by laser radiation that passes through the area of the annular member that is transparent for laser radiation. In this way, the laser welding action can also be realized at locations within the filter housing that are otherwise difficult to access.

For use in particular in connection with a replaceable filter, the filter housing can be preferably in the form of a cup shape or pot shape.

In a further advantageous embodiment, the housing lid can be a connecting head or a connecting flange for a replaceable filter. The connecting head or the connecting flange can be separate components or can also be formed directly as a component, for example, of a motor vehicle, in particular an internal combustion engine, or of an industrial motor. The replaceable filter comprises therefore in particular the filter housing with annular member, a hollow-cylindrical filter element, arranged in the filter housing, and an annular space lid that forms at the connecting side the axial closure of the replaceable filter.

Advantageously, the replaceable filter can have in particular a replaceable or exchangeable filter insert. In this way, as needed, only the filter insert can be exchanged so that the filter housing can be reused. This reduces costs.

Moreover, an internal combustion engine with a connecting head for a filter solves the aforementioned object in that the connecting head has a cylindrical counter connecting member of a filter closure system for a replaceable filter in accordance with the invention.

Finally, the aforementioned object is solved with the method according to the invention according to which, in the receptacle, a sealing device that is interacting with the counter connecting member of the housing lid is connected to the filter housing.

BRIEF DESCRIPTION OF THE DRAWING

Further advantages, features and details of the invention can be taken from the following description in which an embodiment of the invention will be explained in more detail with the aid of the drawing. A person of skill in the art will expediently consider the features disclosed in combination in the drawing, the description, and the claims also individually and will combine them to other meaningful combinations.

In the Figures the same components are referenced with the same reference characters.

DESCRIPTION OF THE PREFERRED EMBODIMENTS

Figure 1:
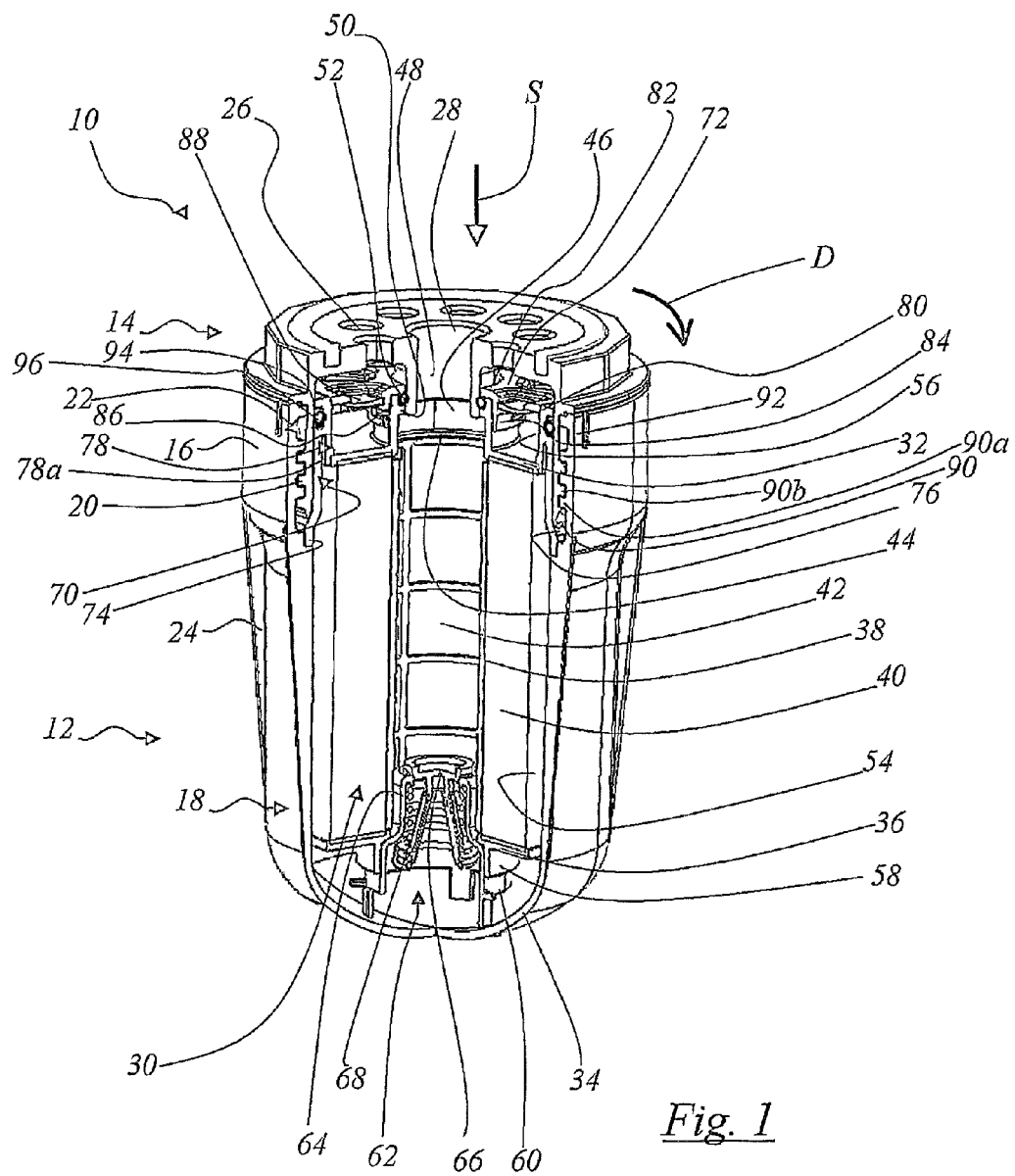
FIG. 1 shows schematically an isometric illustration, partially in section view, of the replaceable filter with a filter housing in which a filter insert is arranged and that is seal-tightly connected to a connecting flange.

In FIG. 1 a liquid filter system 10 with a replaceable filter 12 and a connecting flange 14 is illustrated. A circular cylindrical connecting end 16 at the end face of a cup-shaped or pot-shaped filter housing 18 of the replaceable filter 12 is seal-tightly connected to a matching circular cylindrical counter connecting member 20 of the housing lid that is in the form of a connecting flange 14 by means of a filter closure system that is identified as a whole by 22. The connecting end 16 engages the counter connecting member 20 i.e., is attached to it. The filter housing 18 is made of glass fiber-reinforced plastic material wherein the glass fiber proportion differs based on the mechanical loading in the areas of the filter housing 18. In axially extending reinforcement webs 24 on the exterior side of the filter housing 18 the glass fiber proportion is, for example, higher than in the wall area between the reinforcement webs 24. The connecting flange 14 is made of diecast aluminum. A separate or individual connecting flange 14 can be provided but it is also possible that it is in the form of a connecting head provided directly as a component of an internal combustion engine. The liquid filter system 10 can be used for liquids of any kind of an internal combustion engine, for example, oils, fuels, hydraulic liquids or coolants.

In the connecting flange 14, a plurality of inlet openings 26 for a liquid to be filtered and an outlet 28 for filtered liquid are arranged.

The outlet 28 is concentrically arranged at the center of the connecting counter member 20. The inlet openings 26 are distributed along a concentric circle about the outlet 28 and also arranged in the interior of the counter connecting member 20.

Figure 4:
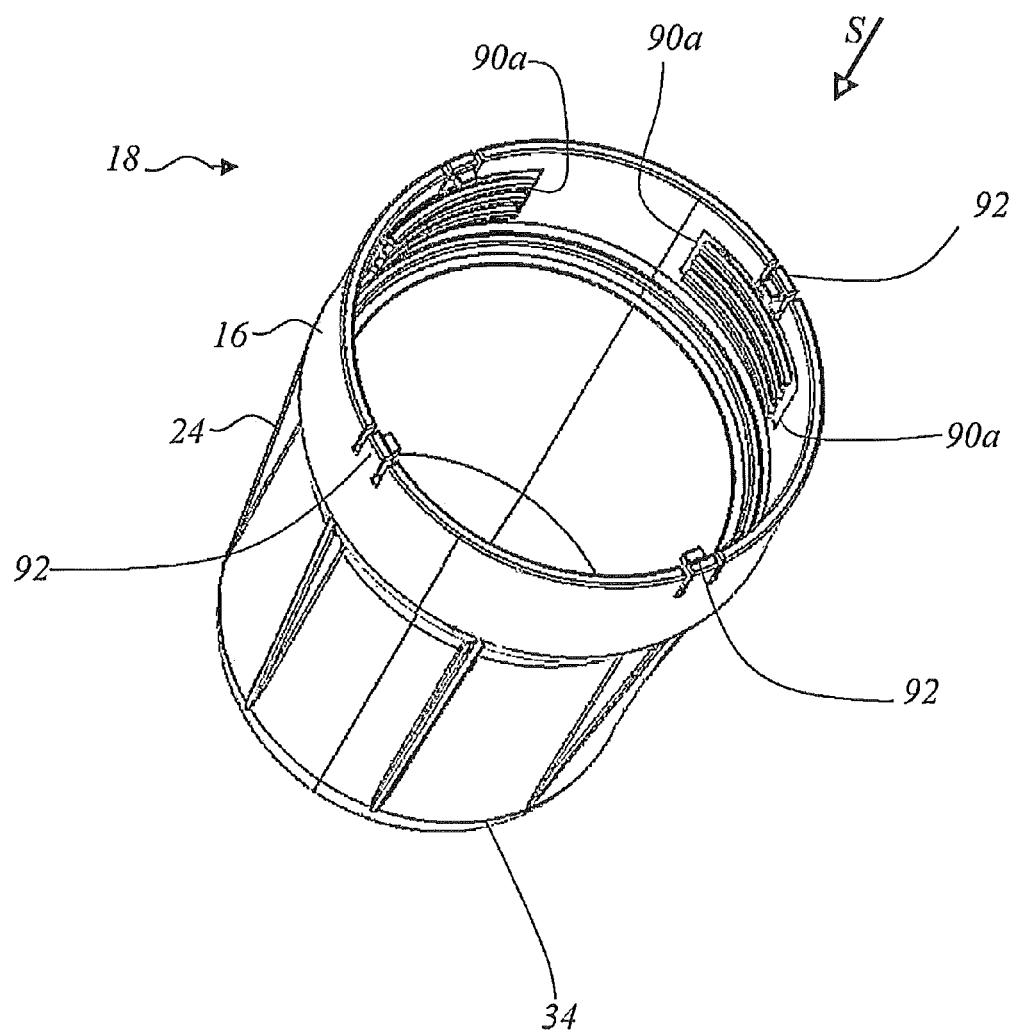
FIG. 4 shows schematically in isometric illustration the empty filter housing of FIGS. 1 to 3.
Figure 5:
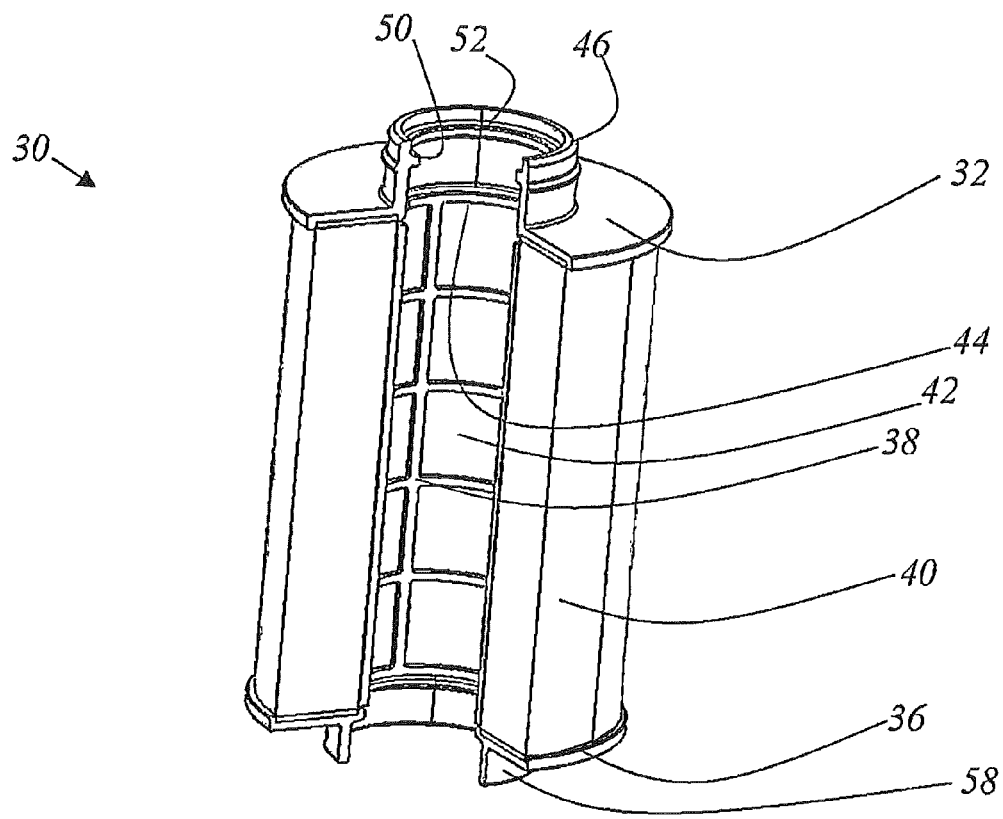
FIG. 5 shows schematically in isometric illustration, partially in section view, the filter insert of FIGS. 1 to 3.

In the filter housing 18, a replaceable or exchangeable filter insert 30 is arranged. The empty filter housing 18 is illustrated in FIG. 4. The filter insert 30 is illustrated in FIG. 5. The filter insert 30 comprises an element lid 32 facing the connecting flange 14, an element bottom 36 facing a bottom 34 of the filter housing 18, and a skeleton-like center tube 38 that extends between the element lid 32 and the element bottom 36. The center tube 38 is surrounded by a filter medium 40 in the form of a filter bellows of zigzag folded filter medium, in particular nonwoven. The center tube 38 delimits an interior 42 of the filter medium 40.

The element lid 32 has an outlet opening 44 concentrically arranged relative to the center tube 38. The outlet opening 44 is surrounded at the side which is facing the connecting end 16 by a hollow-cylindrical connecting socket 46. A connecting socket 48 of the connecting flange 14 is inserted into the connecting socket 46 and forms part of the outlet 28. On its inner circumferential side in radial direction, the connecting socket 46 has an annular sealing shoulder 50 extending in radial direction inwardly. On the annular sealing shoulder 50 an O-ring seal 52 is resting and is located between the inner wall of the connecting socket 46 and the outer wall of the connecting socket 48.

The filter medium 40 is surrounded by an annular inlet space 54 that by means of a annular connecting space 56, to be explained in the following, is in communication with the inlet openings 26 of the connecting flange 14. The filter medium 40 can be flowed through by the liquid to be filtered in radial direction from the exterior to the interior from the annular inlet space 54 to the interior 42.

Figure 6:
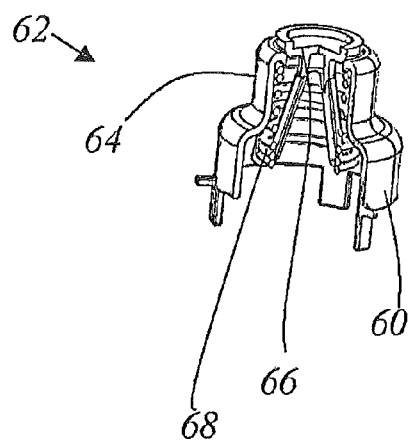
FIG. 6 shows schematically in isometric illustration, partially in section view, a bypass valve for the filter insert of FIGS. 1 to 3 and 5.

The element bottom 36 comprises an opening that is concentric to the center tube 38 and is surrounded by a cylindrical receiving collar 58. In the receiving collar 58, a valve housing 60 of a bypass valve 62 for the filter medium 40 is attached by means of pressfit. The bypass valve 62, shown in detail in FIG. 6, comprises a valve seat 64 and a valve cone 66 movable relative to the valve seat 64 and secured by means of a prestressed spring 68 in the closed position on the valve seat 64 as illustrated in FIG. 1. An inlet side of the bypass valve 62 is in communication with annular inlet space 54. An outlet side of the bypass valve 62 opens into the interior 42 of the filter medium 40. Upon surpassing an opening pressure, which is predetermined by the spring tension of the spring 68, the bypass valve 62 can be flowed through by a liquid for bypassing the filter medium 40.

The filter insert 30 is supported by means of leg-shaped projections of the valve housing 60 of the bypass valve 62 on the bottom 34 of the filter housing 18.

At the connecting end 16, the element lid 32 of the filter insert 30 and thus also the filter insert 30 are secured with an annular member in the form of a hollow-cylindrical securing ring 70 in the filter housing 18. The annular member or securing ring 70 is arranged coaxially relative to the connecting end 16.

On the side of the element lid 32 that is facing the filter medium 40 the area of the securing ring 70 located thereat forms a part of the outer boundary of the annular inlet space 54 in radial direction. On the side of the element lid 32 facing away from the filter medium 40 the securing ring 70, the connecting socket 46 of the element lid 32, the element lid 32, and an annular space lid 72, to be explained in the following, delimit the annular connecting space 56.

Figure 2:
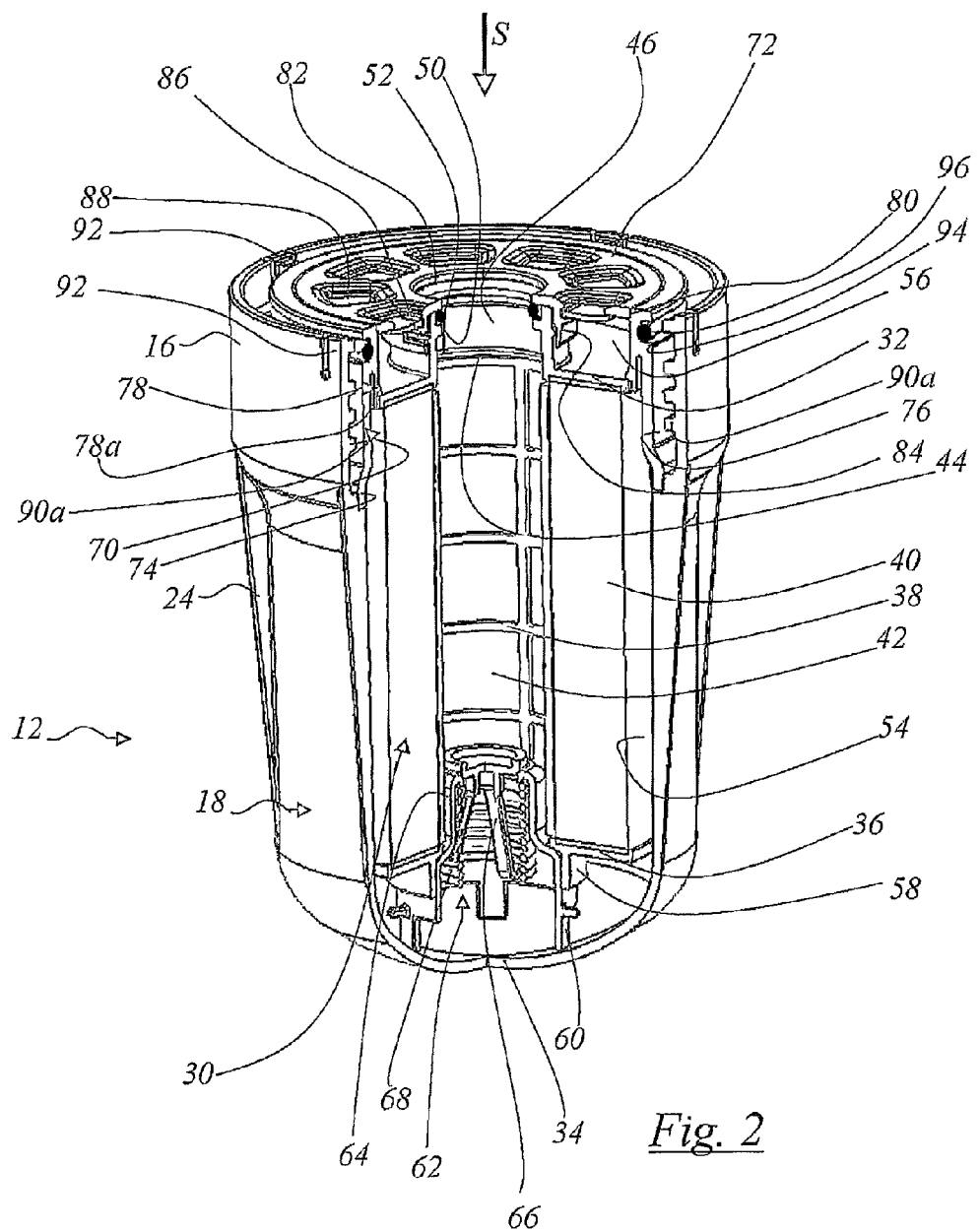
FIG. 2 shows schematically the filter housing of FIG. 1 without connecting flange.

The securing ring 70 is made of a material that is transparent for laser radiation. It is connected at the end face that is facing the bottom 34 of the filter housing 18 with an edge area 74 that is stepped in outward radial direction by means of laser welding circumferentially seal-tightly to the filter housing 18. The securing ring 70 and the cylindrical connecting end 16 delimit a receptacle 76 for the counter connecting member 20 of the connecting flange 14 that can be seen in FIGS. 2 and 3.

Figure 3:
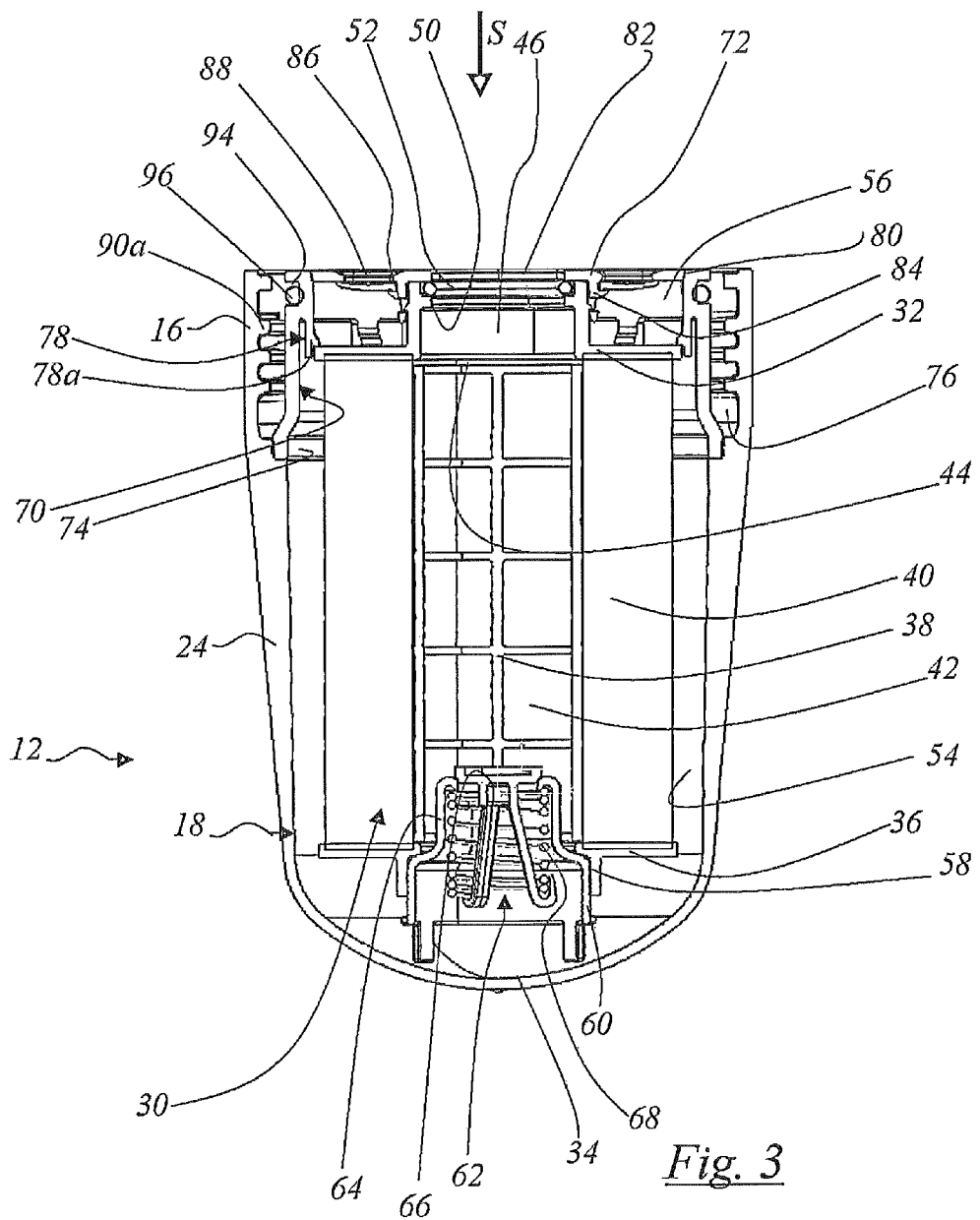
FIG. 3 shows schematically the filter housing of FIGS. 1 and 2 in longitudinal section.

The securing ring 70 has a securing device in the form of a snap-on connection 78 for the element lid 32 of the filter insert 30. The snap-on connection 78 comprises, as illustrated in FIG. 3, a plurality of springy locking elements 78a that are distributed, spaced apart from each other, in circumferential direction on the radial inner side of the securing ring 70. The locking elements 78a are fixedly connected with their fastening ends that are facing the open side of the filter housing 18 to the securing ring 70 and extend axially relative to the filter housing 18. The locking elements 78a each have on the fastening ends a wedge-shaped area. The wedge-shaped areas extend radially to the interior of the filter housing 18. Their radial extension increases toward the bottom 34 of the filter housing 18 so that they form an elastic guiding aid for the element lid 32 upon insertion of the filter element 30 in axial direction into the filter housing 18. At their free ends that are facing the bottom 34 of the filter housing 18 the locking elements 78a each have a locking shoulder for the radial outer rim of the element lid 32 with which the element lid 32 is secured when the filter insert 30 is installed. The intermediate spaces between the locking elements 78*a* serve as fluid connections between the annular connecting space 56 and the annular inlet space 54.

The edge area of the securing ring 70 on the end face that is facing away from the bottom 34 of the filter housing 18 is embodied as a receiving area 80 for the radial outer rim of the annular space lid 72. The annular space lid 72 is secured seal-tightly by means of pressfit in the receiving area 80.

The annular space lid 72 has a central passage 82 for the connecting socket 48 of the connecting flange 14. The passage 82 is aligned with the outlet opening 44 of the element lid 32. The inner diameter of the passage 82 matches approximately the inner diameter of the sealing ring shoulder 50 of the connecting socket 46 so that the annular space lid 72, together with the sealing ring shoulder 50, forms a U-shaped receptacle for the O-ring seal 52.

On the side of the lid 72 that is facing the element lid 32, a connecting collar 84 is extending in axial direction and surrounds the passage 82. The connecting collar 84 is pushed onto the connecting socket 46 of the element lid 32 and is secured thereat by means of a locking connection 86.

The annular space lid 72 comprises a non-return diaphragm 88 that allows liquid flow in a direction from the connecting flange 14 into the annular connecting space 56 but prevents return flow of liquid from the annular connecting space 56 in the direction of the connecting flange 14. The non-return diaphragm 88 is, for example, positively (form-fittingly) connected on the annular space lid 72. Alternatively, it can also be integrally formed by means of a two-component process on the annular space lid 72.

The connecting end 16 of the filter housing 18 can be pushed onto the counter connecting member 20 of the connecting flange 14, i.e, the member 20 is inserted in axial insertion direction S into the connecting end 16, and can be connected positively (form-fittingly) by an insertion-rotation movement positively with the counter connecting member 20. The rotational direction for mounting the filter housing 18 is indicated in FIG. 1 by arrow D. The connecting end 16 and the counter connecting member 20 comprise a bayonet closure 90. As shown in particular in FIG. 4, the bayonet closure 90 at the connecting end 16 has several receiving projections 90*a* that in the insertion direction S are sequentially arranged and are positioned substantially in parallel planes perpendicular to the insertion direction S. On the counter connecting member 20 the bayonet closure 90 has several insertion projections 90*b* that match the receiving projections 90*a* that, as shown in FIG. 1, engage the receiving projections 90*a* when the bayonet closure is locked. The filter closure system 22 comprises thus a multi-row bayonet closure that comprises a rib structure with several, preferably three, parallel ribs that are formed by parallel insertion projections 90*b* and matching receiving projections 90*a*.

FIG. 4 shows that the receiving projections 90*a* at the connecting end 16 are substantially arranged in planes that are perpendicular to the insertion direction S and have an elongate shape but, in circumferential direction, do not extend continuously and all the way around the circumference; instead, for enabling the insertion or push-on movement, the receiving projections 90*a* are segmented, i.e., interrupted as shown.

The insertion projections 90*b* are also elongate, i.e., extend in the circumferential direction of the counter connecting member 20, and are interrupted or segmented. The number of sequential rows of insertion projections 90*b* and receiving projections 90*a* extending in the circumferential direction about the connecting end 16 and the counter connecting member 20, respectively, can be advantageously four; but more or fewer rows are possible also.

The free rim of the connecting end 16 has moreover four locking spring elements 92 that in circumferential direction are located centrally adjacent to the rows of projections 90*a*, respectively. Locking noses of the locking spring elements 92 extend radially toward the interior of the filter housing 18, respectively. In the state in which the filter housing 18 is not connected by the bayonet closure with the counter connecting member 20, the locking spring elements 92 are aligned with small projections (not illustrated) that are provided on the counter connecting member and extend radially in outward direction. In this way, it is prevented that the released replaceable filter can fall or drop in case of a suspended installation.

For connecting the replaceable filter 12 with the connecting flange 14, the filter housing 18 with the connecting end 16 is pushed onto the counter connecting member 20; the counter connecting member 20 is thus immersed in insertion direction S into the receptacle 76 that is delimited by the securing ring 70 and is guided therein; subsequently, rotation of the filter housing 18 in rotation direction D is carried out. The rotation causes the several parallel rows of insertion projections 90*b* of the counter connecting member 20 to engage the several parallel rows of the receiving projections 90*a* of the connecting end 16. In this way, the bayonet closure 90 is locked. The filter housing 18 is positively (form-fittingly) and fixedly secured on the counter connecting member 20 of the connecting flange 14.

The securing ring 70 has in the area of its free edge in the radial outer wall surface a sealing groove 94 with an annular seal 96 that is supported on the radial inner wall surface of the counter connecting member 20 of the connecting flange 14. The annular seal 96 is located on the opposite side of the receiving projections 90*a* of the connecting end 16 so that the sealing action is optimized.

For assembly of the replaceable filter 12, the securing ring 70 together with the annular seal 96 is arranged coaxially in the cylindrical connecting end 16 of the filter housing 18. By means of laser radiation the edge area 74 of the holding ring 70 that is facing the bottom 34 of the filter housing 18 is welded to the filter housing 18 by the laser radiation passing through the securing ring 70.

The filter insert 30 is preassembled with the bypass valve 62 and the O-ring seal 52.

The preassembled filter insert 30 is inserted in axial direction, with the element bottom 36 leading, into the filter housing 18 until the element lid 32 locks at the locking elements 78*a*.

The annular space lid 72, preassembled with the non-return diaphragm 88, is pushed in axial direction, with the connecting collar 84 leading, onto the connecting socket 46 of the element lid 32 wherein the rim of the annular space lid 72 is seal-tightly connected by pressfit to the receiving area 80 of the securing ring 70.

In the above described embodiment of a liquid filter system 10 and a method for mounting a replaceable filter 12 and connecting the replaceable filter 12 with a connecting flange 14 the following modifications are possible inter alia.

The invention is not limited to liquid filter systems 10 for internal combustion engines. It can be used also for other types of filter systems, for example, also for gaseous fluids, in particular compressed air. Such filter systems are generally employed in automotive technology but also in industrial motors.

Instead of the filter medium 40 that is in the form of a filter bellows of zigzag folded nonwoven, a different type of filter medium can be used also.

Instead of the bayonet closure 90, a different type of releasable or detachable quick connection, in particular an insertion-rotation connection or a screw connection or a snap connection or another type of insertion and/or rotation connection can be provided also.

Instead of the snap connection 78 for the element lid 32 or a different kind of terminal element of the filter insert 30, for example, an end disk, a different type of holding device for the filter insert 30 can be provided on the securing ring 70.

Instead of being arranged within the connecting end 16, the securing ring 70 can also be arranged outside of the connecting end 16 coaxially to it. In this case, the connecting end 16 is inserted into, instead of being pushed onto, the counter connecting member 20 of the connecting flange 14.

Instead of having the sealing groove 94 with annular seal 96 the securing ring 70 can be provided also with a different type of sealing device.

Instead of the embodiment of a shut-off device with non-return diaphragm 88, it is possible to employ one or several different types of shut-off devices, for example, valves.

The annular space lid 72 with the non-return diaphragm 88 or other types of shut-off devices can be connected, preferably seal-tightly, by other methods than pressfit, for example, by welding, preferably laser welding, to the securing ring 70.

The terminal edge area of the securing ring 70 can also be connected by means of a different type of welding method or by means of an adhesive connection with the filter housing 18.

The securing ring 70 may be comprised of a material that is transparent for laser radiation only in the area of its terminal edge area 74 with which it is connected to the filter housing 18.

The filter closure system 22 is not limited to the use with a connecting flange 14. Instead of a connecting flange 14, also a different type of connecting part and/or closure part, for example, a connecting head of a motor vehicle, in particular of an internal combustion engine, or in industrial motor or even simply a closure lid can be used.

The connecting flange 14, instead of being made of diecast aluminum, can also be made of other materials, for example, a different metal or a plastic material.

The filter housing 18, instead of being made of glass fiber reinforced plastic material, can also be made of a different material, in particular a different kind of plastic material or a plastic material that is not reinforced or a metal.

The invention is also suitable for filters that do not have exchangeable filter inserts.

While specific embodiments of the invention have been shown and described in detail to illustrate the inventive principles, it will be understood that the invention may be embodied otherwise without departing from such principles.

What is claimed is:

1. A replaceable filter comprising:
a filter housing with an end face formed as a cylindrical connecting end one-piece unitary with said filter housing;
a housing lid having a cylindrical counter connecting member matching said cylindrical connecting end;
a filter closure system that seal-tightly connects by form fit said cylindrical connecting end and said cylindrical counter connecting member when said cylindrical connecting end is inserted or pushed onto said cylindrical counter connecting member in an axial connecting direction and moved by a relative movement, comprising at least one of an insertion movement and a rotation movement, relative to said cylindrical counter connecting member;
an annular member having a U-shaped cross section, the annular member arranged within said filter housing, said annular member arranged coaxially relative to and radially inwardly of said filter housing at its cylindrical connecting end, said annular member including:
a base portion having a free edge;
an annular seal groove formed in a radial outer wall surface of said base portion at said free edge;
a sealing device as an annular seal arranged in said seal groove;
a radially inner leg of said U-shaped cross section of said annular member extending axially inwardly from said base portion and terminating at a securing device, the securing device having a plurality of spaced apart springy locking elements, the springy locking elements engaging onto a top surface or a radial outer edge of an end element of a filter insert arranged in said housing; and
a radially outer leg of said U-shaped cross section of said annular member extending axially inwardly from said base portion to an opposing end facing a bottom of the filter housing, the opposing end, the radially outer leg having a terminal edge area that is received against and welded to or adhesively secured seal-tightly onto an interior side of said filter housing such that said annular member and said cylindrical connecting end form boundaries of a receptacle for said cylindrical counter connecting member;
wherein said sealing device is arranged in said receptacle and connected to said filter housing, said sealing device interacting with said cylindrical counter connecting member;
wherein said annular member and said cylindrical connecting end of said filter housing delimit said receptacle therebetween;
wherein said cylindrical counter connecting member is inserted into said receptacle, said cylindrical counter connecting member positioned radially intermediately between said cylindrical connecting end of said filter housing and said annular member;
wherein a first set of interacting elements is secured on said interior side of said filter housing at said cylindrical connecting end;
wherein a second set of interacting elements is arranged on said cylindrical counter connecting member;
wherein said first set of interacting elements engage said second set of interacting elements.

2. The replaceable filter according to claim 1, wherein said sealing device comprises a radially acting seal.

3. The replaceable filter according to claim 1, wherein said annular member is hollow-cylindrical.

4. The replaceable filter according to claim 1, wherein interacting elements form a releasable quick connection.

5. The replaceable filter according to claim 4, wherein said quick connection is a bayonet closure; a screw connection; or a snap connection.

6. The replaceable filter according to claim 1, wherein said annular member is arranged inside said cylindrical connecting end.

7. The replaceable filter according to claim 1, wherein said securing device is a snap connection that acts on said end element of said filter insert.

8. The replaceable filter according to claim 1, comprising a shut-off device, wherein said annular member has a receiving space and said shut-off device is arranged in said receiving space.

9. The replaceable filter according to claim 8, wherein said shut-off device comprises a non-return diaphragm.

10. The replaceable filter according to claim 8, wherein said shut-off device is connected seal-tightly by pressfit or by welding to said annular member.

11. The replaceable filter according to claim 1, wherein at least said terminal edge area of said annular member is comprised of a material transparent for laser radiation.

12. The replaceable filter according to claim 1, wherein said filter housing is cup-shaped and wherein said housing lid is a connecting head or a connecting flange.

13. The replaceable filter according to claim 1, comprising an exchangeable filter insert.

\* \* \* \* \*